(12) United States Patent
Templeman

(10) Patent No.: X1226
(45) Date of Patent: Mar. 6, 1810

(54) BRIDGES

(76) Inventor: John Templeman

John Templeman
Letters Patent

The schedule referred to in these Letters Patent and making part of the
same containing a description in the words of the said John Templeman
himself of his improvements in the construction of bridges.....

Instead of making the links for chain bridges of square bars round iron
make them of flat bars say with one bar three quarters of an inch thick and
inch and half wide to be an inch thick at both ends six inches in length
at each end. then take two bars of three eighths of an inch thick and an inch
and an half wide to be four eighths of an inch thick at each end and six
inches in length on each end then punch corresponding holes in all the
ends about two inches from the end and when they are about three quarters
of an inch open then flatten them down and round or drill them all to
the same size and perfectly even then make bolts to fit them: then put
the bolts through and rivet them By this means the chains will consist
of one single bar link and one double bar link alternately unless it is pre-
ferred to have them all double bar links and in that case all the bars
must be of an equal thickness Before the bars are rivetted together holes
of about a quarter of an inch diameter should be punched through the
middle of the two bars to correspond and then a piece of iron three quar-
ters of an inch thick and inch and half square should be punched
through and then placed between the two thin bars and rivetted to afford
solidity The additional thickness of the iron at the ends is to compensate for the
loss of strength by having the holes through them. The [illegible] of course
as circumstances require . The iron ought to be made on pur-
pose and of a [illegible] wire rope or brass wire rope are to
be made by slightly twisting [illegible] or [illegible]. [illegible] then and
after forming them into strands then lay them together like a
[illegible] second set of strands can be made and laid to the others
and if that of the three should . [illegible] hollow parts

[illegible] of my improvements in the construction of Bridges by these improve
[illegible] chains and [illegible] I only refer to fasten stay to abutments or piers by
wrought iron which is to be fixed in the [illegible] masonry or be cast Iron
into a Stone [illegible] [illegible] refer to the above mentioned Chains are [illegible]
[illegible] and perfectly elevated the may be floored by laying cross timber
on the [illegible] and building up in that way to a sufficient height
and then putting on the plank and railing. But the best way is to make
these [illegible] sections of [illegible] having [illegible] and to have each section connec
[illegible] with the rest [illegible] of timber laid [illegible] on the ropes that [illegible]
chains. in this case the posts should be left long enough to answer the double
purpose of support to the floor and the railing which will connect the whole
together with much firmness. These floors will [illegible] if [illegible] [illegible] in
some degree corresponding with the course of the rope or Chain. Another of my im
-provements in the construction of Bridges which will be cheap and answer
for a span of one hundred feet in length without any support from chains
or ropes. In this case uprights are set on the abutments and piers and
from the top of the upright come down braces or flat bar iron or wood say white
oak plank of about four inches thick and six inches wide. These braces
are to be of various lengths and to be connected with the flooring of the
Bridge in a firm manner by bolts to large timber. By adding middle up
-right braces this sort of bridge can be covered and when the bracing is
of wood holes are to be bored about ten inches [illegible] the ends big enough
to receive a bolt of an inch in diameter and then on both sides of the
plank at the ends rivet on plates of iron of about half an inch thick
and two feet long to give strength to the wood where the bolts go. The
iron and wooden braces above described I apply to James Finlays
Chain bridge for the purpose of affording steadiness and solidity to the
floor as well as additional strength. For the main support of small brid
-ges or for the support of an old bridge, my improvement is to have a
sort of wooden Chain to be made with iron plates on the ends with holes
through them and to be put together like the abovementioned flat bar
iron Chain. In such case the wood must be of a size to meet the degree
of strain required. Another of my improvements applicable to [illegible]

Finlays bridge of one Span is to have a plurality of Spans, (as shewn in the
bridge erected over the river Schuylkill under my direction) And an improve
-ment of importance in the chain bridge is the one invented by me
instead of the method communicated by James Finley of having the
uprights on each side so high that the posts are placed under the chain
[illegible] across the tops of the uprights. I form the chain in the following
manner — I place posts in each pier of large square timber so high only
as to correspond with the posts on the other piers or abutments and set
them from eight to ten feet in the masonry of the piers in boxes of plank or
[illegible] stone or iron to be filled with turpentine to preserve the posts (the chain
may rest on the pier without the post) At the bottom they are to be connected
by large bars of iron which is to be worked into the stone. Bolts of wood or
cast iron are to be fixed in the mason work on the upper surface of the
piers for the purpose of receiving braces to support the posts. The posts are then
to be capt with a large piece of square timber over which the chains are to
pass. In this case there is to be brace chains to come up from the bottom of the
pier to which they are to be connected, when the foundation is laid and
the main chains in the support of the bridge are also to be secured to the
bottom of the piers either to the timbers on which the piers rest or sufficiently
secured in the masonry. If the water is salt or brackish the chains must
be made of copper as far as they go into the water. The use of many chains
made of small iron divides the rest                                   frosty weather
and affords a better opportunity of detecting flaws                         of chains
suspended side by side is a great improvement on James Finleys
                                        in chain on a side and that made of long
links is                                mentioned in my patent of the 16 of August 1808
of great                                          and that the more [illegible] the [illegible]
it is                                             to the application to the support of bridges
by chain                              they                              that have been thought
a rolling mill or otherwise [illegible] to flat and thin bars or slips
The sort of chain is made in the same manner with the flat bar chain except
that it is composed of more bars or slips. They are to be preserved from oxydation by
varnish or other [illegible] covering                    John Templeman
Witnesses: William Thornton
George Dyer